3,239,535
Patented Mar. 8, 1966

---

3,239,535
1-METHYLPYRROLIDINE-1-OXIDE
Scott Searles, Jr., Manhattan, Kans., assignor to General
Electric Company, a corporation of New York
No Drawing. Filed Oct. 31, 1963, Ser. No. 320,526
1 Claim. (Cl. 260—313)

The present invention relates to new and novel compositions of matter consisting of 1-methylpyrrolidine 1-oxide and N,N-dimethyl-p-nitrobenzylamine oxide, which are especially suitable curing materials for epoxy resins. More particularly these new compositions of matter are useful in providing improved heat curable mixtures comprising one or more epoxy resins and at least one tertiary amine oxide.

This application is a continuation-in-part of my copending application, Serial No. 141,627, filed September 29, 1961, entitled, "Epoxy Curing Materials."

Epoxy, epoxide or ethoxyline compositions having the grouping

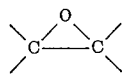

are well known, commercially available materials having a variety of applications in the art. Generally, such epoxy materials comprise a polyether derivative of a polyhydric organic compound, the derivative containing 1,2 epoxy groups, and the organic compound being selected from the group consisting of polyhydric alcohols and polyhydric phenols containing at least two hydroxy groups. For example, U.S. Patent 2,324,483 to Castan discloses epoxy resin compositions comprising the reaction product of phenols having at least two phenolic hydroxy groups and an epihalohydrin, such as epichlorohydrin. The reaction product disclosed is described as having at least two epoxy groups, and may not be cured to a thermoset infusible mass by the use of a carboxylic or polybasic acid, or acid anhydride, such as phthalic anhydride.

In addition to the use of polybasic acids and acid anhydrides as curing or hardening agents for epoxy resins, the use of a variety of organic "amine-type" materials has also been recognized, as illustrated by Patent 2,444,333 to Castan. In general, these "amine-type" materials consist principally of primary or polyfunctional amines, i.e., amines containing at least two active hydrogen atoms per molecule which are attached directly to the nitrogen atom, and boron trifluoride-amine type complexes. However, the pot life of epoxy resins containing an amine curing agent is comparatively short, and the high temperature characteristics of the cured resin are often poor. In addition, the amines themselves are highly toxic materials and are thus difficult to handle by workers in the art. The deleterious effect of atmospheric humidity on the boron trifluoride-amine complexes, which react irreversibly with water, has also raised a difficult problem. Further, the amines or amine-boron trifluoride complexes remain in their original form in the cured resin product, and cause either continued polymerization of the resin, or the slight conduction of current therethrough during use, or both, which effects may seriously interfere with the satisfactory use of the cured resin in a particular installation requiring high electrical insulation characteristics.

Accordingly, it is an object of the present invention to provide new and novel compositions of matter consisting of 1-methylpyrrolidine 1-oxide, and N,N-dimethyl-p-nitrobenzylamine oxide, which are especially suitable for use as curing or hardening agents for epoxy resins.

In general, any epoxy resin containing the grouping

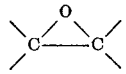

may be cured with the compounds of the present invention. Examples of such resins are given in U.S. Patents 2,324,483 and 2,444,333 to Castan, and British Patents 518,087, and 579,698. Generally, the epoxy resins described therein are the reaction products of an epihalohydrin such as epichlorohydrin and a phenol having at least two phenolic hydroxy groups such as bis-(4-hydroxyphenol)-2,2-propane. U.S. Patents 2,494,295 to Greenlee, 2,500,600 to Bradley and 2,511,913 to Greenlee further describe epoxy resins which may be used in conjunction with the present invention. The epoxy resins used therein have more than one epoxy group per molecule and may be obtained by reacting a polyhydroxy alcohol or phenol such as hydroquinone, resorcinol, glycerine, condensation products of phenols with ketones, such as, for example, bis-(4-hydroxyphenol)-2,2-propane, with epichlorohydrin. The reaction of epichlorohydrin with bis-(4-hydroxyphenol)-2,2-propane is as follows:

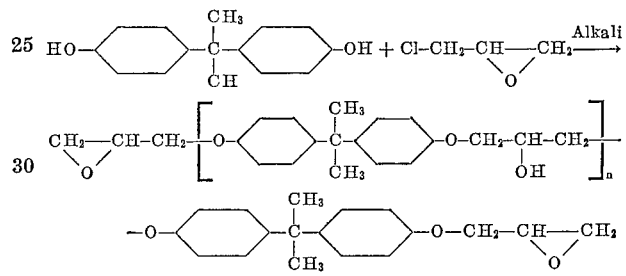

where $n$ has an average value ranging from 0 to 10. Such ethoxyline resins are sold under the name of Epon by Shell Chemical Corporation, under the name Araldite by the Ciba Company, as Epi-Rez resins by Devoe-Raynolds Company, and ERL resins by the Bakelite Company. The data given below for such resins is representative.

TABLE I

| Epoxy Resin | Epoxide Equivalent | M.P., degrees |
|---|---|---|
| Epon 828 | 192 | 9 |
| Epon 834 | 225–290 | 20–28 |
| Epon 1001 | 450–525 | 64–76 |
| Epon 1004 | 905–985 | 97–103 |
| Epon 1007 | 1,600–1,900 | 127–133 |
| Epon 1009 | 2,400–4,000 | 145–155 |
| Epon 1062 | 140–165 | Liquid |
| Epon 1064 | 300–375 | 40–45 |
| Araldite 6010 | 192 | Liquid |
| Araldite 6020 | 200–205 | Liquid |
| ERL-2774 | 175–200 | Liquid |
| Epi-Rez 510 | 175–200 | Liquid |

As shown in my copending application, of which this application is a continuation-in-part, any tertiary amine oxide or mixture of such tertiary amine oxides may be used as curing or hardening agents for any type of epoxy material having the grouping:

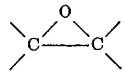

In this regard, it is noted that the low values of the ionization constants of tertiary amine oxides, as contrasted with the ionization constants of their corresponding amines, would lead one skilled in the art to conclude that these amine oxides would be relatively inactive toward epoxy materials. Unexpectedly, however, it was discovered that tertiary amine oxides are especially suitable an epoxy curing or hardening agents, and possess several advantages over the use of the "amine-type" curing agents heretofore employed in the prior art. Notably, the tertiary amine oxides are not toxic materials as are the types of amines which were heretofore employed as epoxy resin hardeners and are thus much easier to handle. Moreover, the tertiary amine oxides, after initiating polymerization and cross linking of epoxy type materials form polymer end groups (trialkylalkoxyammonium groups) which are known to decompose into aldehydes and tertiary amines upon warming. Accordingly, the use of tertiary amine oxides provides a curing or hardening catalyst which may be automatically eliminated from the cured epoxy material. Thus, the slight conduction of electric current through the polymerized resin product as well as the continued polymerization of that product due to continued presence of catalyst is entirely prevented.

A further advantage inherent in the use of tertiary amine oxides as epoxy material hardeners resides in the fact that atmospheric humidity has less of an effect on the catalytic efficacy of these compounds than on the more hygroscopic amine-boron trifluoride complexes, which, as stated above, react irreversibly with water. In the case of tertiary amine oxides, absorbed water may be removed simply by heating, or by the employment of vacuum, or both, either in the pure state of these oxides or after incorporation into the epoxy resin. Moreover, and perhaps most importantly, the pot life of epoxy-amine oxide mixtures is excellent, being in some cases in excess of two weeks.

As stated, any tertiary amine oxide may be employed for the purposes set forth above. Among the preferred tertiary amine oxides capable of use as epoxy resin hardeners or curing catalysts, however, are those corresponding to the general formula

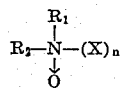

where $n$ is a number from 0–1, X is a radical selected from the group consisting of alkyl radicals, e.g. methyl, ethyl, propyl, isopropyl, butyl, octyl, etc. radicals; cycloalkyl radicals, e.g. cycloexyl, cycloheptyl, etc. radicals; aryl radicals, e.g. phenyl, diphenyl naphthyl, etc. radicals; alkaryl radicals, e.g. tolyl, xylyl, ethyl phenyl, etc. radicals; aralkyl radicals, e.g. phenylethyl, benzyl, etc. radicals; haloaryl radicals, e.g. monochlorophenyl, dibromophenyl, tetrochlorophenyl, monofluorophenyl, etc. radicals; haloalkyl radicals, e.g. chloroethyl, chloromethyl, pentafluoroethyl, etc. radicals; cyanoalkyl radicals, e.g. cyanomethyl, cyanoethyl, cyanopropyl, etc. radicals; nitroalkyl radicals, e.g. nitromethyl, nitroethyl, etc. radicals; nitroaryl radicals, e.g. nitrophenyl, nitronaphthyl, etc. radicals; nitroarylalkyl radicals, e.g. nitrobenzyl, nitrophenylethyl, etc. radicals; $R_1$ is a radical selected from the same class of radicals as X above, and in addition, may consist of at least one carbon atom connected through $R_2$ so that

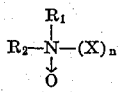

forms a heterocyclic ring such as pyridine, pyrrolidine, morpholine, lutidine, picoline, etc. and $R_2$ is a radical selected from the same class of radicals as X above and, in addition, may consist of at least one carbon atom connected through $R_1$ so that

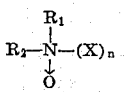

forms a heterocyclic ring.

The tertiary amine oxides that are utilized as the curing agents for epoxy materials should preferably be soluble in the epoxy material to be cured so as to obtain a homogeneous solution therewith. In certain instances, however, it may be advantageous to employ a small quantity of a common solvent so as to obtain a solution of the amine oxide in the epoxy material to be hardened.

Among the varieties of tertiary amine oxides which may be used as curing agents for epoxy materials are two new and novel compounds of the present invention which have been found to be especially suitable. They are 1-methylpyrrolidine 1-oxide and N,N-dimethyl-p-nitrobenzylamine oxide.

The preparation of tertiary amine oxides by the treatment of a tertiary amine with a suitable oxidizing agent has been described in the prior art, mostly in the scientific literature. It has been shown, for example, that some tertiary amine oxides could be prepared by reacting a tertiary amine with hydrogen peroxides in an aqueous reaction medium. It has also been reported in the prior art that the tertiary amine oxide product is unstable and is not a crystalline product. Thus, it has been reported that tertiary amine oxide derivatives, such as the amine oxide hydrohalides, have often been prepared since these compounds are usually more stable than the tertiary amine oxide itself and also are usually crystalline whereas the tertiary amine oxides are not. Moreover, it has been reported in the prior art that tertiary amine oxides with hydrogen atoms attached to a carbon atom in the position beta to the amine nitrogen atom are very temperature unstable and decompose rapidly at a temperature of about 100° C.

Unexpectedly the two new tertiary amine oxides of this invention instead of being noncrystalline and unstable have been isolated as pure crystalline thermally stable solids. More specifically, the 1-methylpyrrolidine 1-oxide of this invention was isolated as a pure crystalline solid which exhibited no detectable decomposition when heated at 150° C. for one hour. This property is wholly unexpected in view of the fact that 1-methylpyrrolidine 1-oxide has four beta hydrogen atoms available for reaction.

Although N,N-dimethyl-p-nitrobenzylamine oxide, the other tertiary amine oxide of this invention, does not exhibit such a high degree of temperature stability as 1-methylpyrrolidine 1-oxide, it was much more stable than would be expected from the prior art reports in the scientific literature relating to tertiary amine oxides. This tertiary amine oxide was also isolated as a pure crystalline solid.

Both of the special and unexpected properties of these tertiary amine oxides make them especially suitable for use as the curing agents in the heat curable epoxy compositions of my above referenced copending application of which this application is a continuation-in-part.

In order that those skilled in the art may better understand how the present invention may be practiced, the following examples of making and using the new and novel tertiary amine oxides of the present invention as well as using a variety of known tertiary amine oxides are given by way of illustration and not by limitation. All parts and percentages are by weight unless otherwise noted.

*Example 1*

66 grams (0.60 mole) of a 30% hydrogen peroxide solution was slowly added with stirring to 30 grams (0.40 mole) of N-methylpyrrolidine which had been previously cooled in an ice bath. The stirring was continued for a period of about 4 hours after which the mixture was permitted to remain at room temperature for about 20 hours. Thereafter, the excess hydrogen peroxide was decomposed by introducing platinum foil and warming the mixture slightly. Upon the termination of oxygen evolution, the solution was evaporated under reduced pressure with the assistance of a water pump. Subsequently, evaporation was continued with the assistance of an oil pump which was operated for several hours. A white, crystalline solid remained, consisting of 1-methylpyrrolidine 1-oxide. The oxide was very soluble in water, giving a very weakly basic solution, a feature characteristic of the low molecular weight members of its class. Due to the hygroscopic nature of the compound, an accurate determination of its melting point by the usual method was found to be difficult. The melting point was estimated, however, at 60° C. The structure of the compound was confirmed by infrared analysis. Absorption bands were found at 6.1, 6.5, 7.0, 10.7 and 12.2 microns. It was further observed that the spectrum was practically unchanged after the compound had been treated at 150° C. for 1 hour and 210° C. for 5 minutes, indicating that the compound was unusually stable to heat for an amine oxide having a hydrogen atom on a beta carbon atom.

A warm alcoholic solution of 1.0 gram of picric acid was added to a warm alcoholic solution of 0.5 gram of 1-methylpyrrolidine 1-oxide and practically quantitative yield of the picrate salt of that oxide was rapidly precipitated. After recrystallization from an alcohol-ether mixture, this derivative was obtained as thick, yellow, rod-shaped crystals having a melting point within the range of 201–204° C. Analysis of these crystals showed them to contain: C—40.16 percent; H—4.22 percent; N—16.99 percent; O—38.63 percent. The theoretical analysis for the expected $C_{11}H_{14}N_4O_8$ is: C—40.00 percent; H—4.27 percent, N—16.97 percent; O—38.76 percent.

*Example 2*

To a solution of one mole of N,N-dimethyl-p-nitrobenzyl amine dissolved in ten parts of acetone were added, with stirring, 1.5 moles of 30 percent hydrogen peroxide. The resulting solution was then allowed to remain at room temperature for about 24 hours. Water and a piece of platinum foil were subsequently introduced so as to decompose the unreacted hydrogen peroxide. When the evolution of hydrogen had ceased, the platinum foil was removed, and solvent removal effectuated by vacuum distillation at a temperature below 75° C. The resulting amine oxide crystals were hygroscopic in nature and darkened on standing. The picrate analysis was: C—42.65 percent; H—3.85 percent; N—16.23 percent; O—37.27 percent. The theoretical analysis for the expected $C_{15}H_{15}N_5O_{10}$ is: C—42.36 percent; H—3.55 percent; N—16.47 percent; O—37.62 percent.

*Example 3*

1.5 grams of 1-methylpyrrolidine 1-oxide were added to 103 grams of Epon 828 resin (an epoxy resin formed from bisphenol and epichlorohydrin, having an epoxide equivalent of 192, a melting point of 9° C. and a viscosity at 5,000–15,000 cps. at 25° C.). The mixture was continually stirred until the amine oxide was completely dispersed in the resin. The resulting amine oxide solution was poured into a mold containing a ¼" by ¼" by 1" iron slug and the mold placed in a forced draft oven which was maintained at a temperature of 100° C. The resin-amine oxide mixture gelled in approximately one hour and was very hard in 1.5 hours. The temperature within the oven was then raised 200° C. and the resin post-cured at that temperature for two hours. Thereafter, the cloudy aspect of the resin disappeared (due to the elimination of the amine oxide end groups) and the resin became extremely clear and hard, and had a slightly reddish color.

The cured resin product obtained in Example 3 was then subjected to two cycles of heating at 200° C. for about six hours. Thereafter, the molded resin was chilled at −30° C. for about 16 hours (with 1–2 hours at room temperature at each temperature change). No cracking of the molded resin product was observed nor was there any deterioration of any of its physical properties. The resin was thereafter thrust into a 200° oven directly from a −30° C. freezer, and no cracking whatever occurred. The molded product was unusually hard when hot and did not exhibit any brittle properties when cold.

Table II, below, illustrates the use of a variety of tertiary amine oxides as curing catalysts or hardeners for epoxy type materials. The method employed in Examples 4–15 (enumerated in Table II) was the same as that followed in Example 3. The Epon 828 was similar to that used in Example 4 whereas the D.E.N. 438 used was an epoxy resin comprising the reaction product of a phenol-formaldehyde resin and epichlorohydrin. D.E.N. 438 is a product of Dow Chemical Corporation, Midland, Michigan.

TABLE I.—AMINE OXIDE CONCENTRATION (WEIGHT PERCENT)

| Example | Amine Oxide Used | Epon 828 | In D.E.N. 438 | Curing time (Hours) | | |
|---|---|---|---|---|---|---|
| | | | | At 100° C. | At 150° C. | At 200° C. |
| 4 | Tribenzylamine oxide. | | 4.3 | 24 | 8 | |
| 5 | N,N-dimethyl-p-nitrobenzyl-amine oxide. | 2.62 | | 10 | 8 | 6 |
| 6 | N,N-dimethylaniline oxide. | | 1.9 | | 8 | 24 |
| 7 | Trimethylamine oxide. | 1.0 | | 2 | 2 | 2 |
| 8 | Triethylamine oxide. | | 1.66 | 1.7 | 4 | 24 |
| 9 | Tri-n-butylamine oxide. | | 2.85 | 4 | 8 | 24 |
| 10 | Pyridine 1-oxide. | | 1.23 | 24 | 6 | 4 |
| 11 | 4-picoline-1-oxide. | | 1.46 | 24 | 4 | 4 |
| 12 | 2,6-lutidine-1-oxide. | | 1.64 | | | 24 |
| 13 | 1-methylmorpholine-1-oxide. | 1.68 | | | 10 | |
| 14 | Triethanolamine oxide. | | 2.35 | | | 24 |
| 15 | N,N-dimethyl-benzylamine oxide. | 2.15 | | 6 | 2 | 10 |

While the examples listed above have been performed with the use of only a limited number of epoxy resins, it should be understood that, as stated above, any type of epoxy material having the grouping

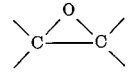

may be employed to provide the new and improved heat curable epoxy resin tertiary amine oxide systems.

Included among the epoxy-containing materials which may be cured with the tertiary amine oxides of this invention are the epoxidized esters of the polyethylenically unsaturated monocarboxylic acids, such as epoxidized linseed, soyabean, perilla oiticia, tung, walnut and dehydrated castor oil, methyl linoleate, butyl linoleate, ethyl 9,12-octadecadienoate, butyl 9, 12 15-octadecatrienoate, ethyl elaeostearate, octyl 9,12-octadecadienoate, methyl elaostearate, monoglycerides of tung oil fatty acids, monoglycerides of soyabean oil, sunflower, rapeseed, hempseed, sardine, cottonseed oil and the like.

Another group of epoxy containing materials capable of being cured with the tertiary amine oxides of the invention include the epoxidized esters of unsaturated monohydric alcohols and polycarboxylic acids, such as, for example, di(2,3-epoxybutyl) adipate, di(2,3-epoxybutyl) oxalate, di(2,3-epoxyhexyl) succinate, di(3,4-epoxybutyl) maleate, di(2,3-epoxyoctyl) pimelate, di(2,3-epoxybutyl) phthalate, di(2,3-epoxyoctyl) tetrahydrophthalate, di(4,5-epoxydodecyl) maleate, di(2,3-epoxybutyl) terephthalate, di(2,3-epoxypentyl) thiodipropionate, di(5,6-epoxytetradecyl) diphenyldicarboxylate, di(3,4-epoxyheptyl) sulfonyldibutyrate, tri(2,3-epoxybutyl) 1,2,4- butanetricarboxylate, di(5,6-epoxypentadecyl) tartarate, di(4,5-epoxytetradecyl) maleate, di(2,3-epoxybutyl) azelate, di(2,3- epoxybutyl) citrate, di(5,6-epoxyoctyl) cyclohexane-1,3-dicarboxylate, di(4,5-epoxyoctadecyl) malonate.

A further group of the epoxy-containing materials which may be cured include epoxidized derivatives of polyethylenically unsaturated polycarboxylic acids, such as, for example, dimethyl 8,9,12,13-diepoxyeicosanedioate, dibutyl 7,8,11,12-diepoxyoctadecanedioate, dioctyl 10,11-diethyl-8,9,12,13-diepoxyeicosanedioate dihexyl 6,7,10,11-diepoxyhexadecanedioate, didecyl 9-epoxy-ethyl-10,-11-epoxyoctadecenedionate, dibutyl 3-butyl-3,4,5,6-diepoxycyclohexane-1,3-dicarboxylate, dicylohexyl 3,4,5,6-diepoxycyclohexane-1,2-dicarboxylate, dibenzyl 1,2,4,5-diepoxycyclohexane-1,2-dicarboxylate and diethyl 5,6,10,11-diepoxyoctadecyl succinate.

Still another group capable of being similarly cured comprises the epoxidized polyesters obtained by reacting an unsaturated polyhydric alcohol and/or unsaturated polycarboxylic acid or anhydride groups, such as, for example, the polyester obtained by reacting 8,9,12,13-eicosadienedioic acid with ethylene glycol, the polyester obtained by reacting diethylene glycol with 2-cyclohexene-1,4-dicarboxylic acid and the like, and mixtures thereof.

Another group of epoxy materials capable of being cured with the tertiary amine oxides of this invention comprises the epoxidized polymers and copolymers of diolefins, such as butadiene. Examples of this include, among others, butadiene-acrylonitrile copolymers (Hycar rubbers), butadiene styrene copolymers and the like.

As stated above, in addition to the tertiary amine oxides of this invention, any tertiary amine oxide or mixture of two or more tertiary amine oxides may be used to cure an epoxy resin in accordance with the invention of my above referenced copending application. Among such tertiary amine oxides may be mentioned, for instance, 1-methylpiperidine 1-oxide, 1-methylazetidine 1-oxide, isoquinoline 1-oxide, quinoline oxide and pyrazine 1-oxide.

By suitably proportioning the starting materials and the temperature, the length of time required for a satisfactorily hardening or curing of any epoxy resin can be varied within wide limits. In general, the amount of tertiary amine oxide used in the practice of the present invention may also vary within a wide range. Satisfactory results have been obtained in curing epoxy type materials containing from about 0.1 to as high as 10% by weight of tertiary amine oxide based upon the weight of the epoxy resin. In the preferred embodiment of the present invention, however, the minimum amount of tertiary amine oxide employed is such as to obtain a total cure of the resin with a reasonably short period of time at a temperature of from about 100–200° C. Accordingly, ranges from about 0.5 to 5% have been found to be generally suitable and to satisfactorily effectuate the total cure of an epoxy resin. It should be recognized, of course, that more or less amine oxide curing catalysts may be used depending upon the specific epoxy material that is to be cured.

As will be appreciated by those skilled in the art, the new tertiary amine oxides of this invention may be employed in heat curable tertiary amine oxide-epoxy resin systems for a variety of important applications. These useful tertiary amine oxide-resin systems may be used, for example, in the preparation of coating compositions such as enamels, paints and varnishes, in the preparation of pottings and castings, and as adhesives for a wide variety of materials. Due to the "self-eliminating" nature of the tertiary amine oxide curing catalyst, these epoxy resin-tertiary amine oxide systems are particularly suitable for the preparation of cured resin products which are to be used in applications requiring good electrical insulation characteristics.

What I claim as new and desire to secure by Letters Patent of the United States is:

Crystalline 1-methylpyrrolidine 1-oxide.

References Cited by the Examiner

UNITED STATES PATENTS 3,047,579  7/1962  Witman _____ 260—289

OTHER REFERENCES

Cram et al., Organic Chemistry, McGraw-Hill Book Co., Inc., New York, 1959, pages 17–19.

Thesing et al., Chem. Ber., vol. 92, 1959, pages 1748–1755.

NICHOLAS S. RIZZO, *Primary Examiner.*

MARY O'BRIEN, *Assistant Examiner.*